US006339513B1

(12) United States Patent
Hirose

(10) Patent No.: US 6,339,513 B1
(45) Date of Patent: Jan. 15, 2002

(54) DATA CARRIER LOADER AND METHOD FOR LOADING

(75) Inventor: Yoshimi Hirose, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/469,393

(22) Filed: Dec. 22, 1999

(30) Foreign Application Priority Data

Dec. 24, 1998 (JP) .......................................... 10-366906

(51) Int. Cl.$^7$ .............................................. G11B 15/68
(52) U.S. Cl. ...................................................... 360/92
(58) Field of Search ............................ 360/92, 91, 90, 360/88, 267.3, 267.4; 369/258, 178, 30, 223, 249

(56) References Cited

U.S. PATENT DOCUMENTS

| | | | | |
|---|---|---|---|---|
| 3,879,758 A | * | 4/1975 | Pyles ........................... | 360/92 |
| 5,237,467 A | * | 8/1993 | Marlowe ...................... | 360/92 |
| 5,742,445 A | * | 4/1998 | Inazawa et al. ............... | 360/71 |

FOREIGN PATENT DOCUMENTS

| | | |
|---|---|---|
| JP | 3-70305 | 11/1991 |
| JP | 4137546 | 12/1992 |
| JP | 6-36435 | 2/1994 |
| JP | 6-84542 | 12/1994 |
| JP | 7-287909 | 10/1995 |
| JP | 8115558 | 5/1996 |
| WO | WO 91/05346 | 4/1991 |

* cited by examiner

Primary Examiner—Hoa T. Nguyen
Assistant Examiner—Angel Castro
(74) Attorney, Agent, or Firm—Young & Thompson

(57) ABSTRACT

A data carrier loader for moving a recording medium such as a magnetic tape cartridge from a first position to a second position, the data carrier loader comprising, an accessor 7 for holding and moving a recording medium from the first position to the second position, a protrusion 71 provided on the accessor 7, a guide member 13 for guiding movement of the accessor 7 from the first position to the second position, a rotatable screw shaft 8 on which is formed a helical groove 81, with which the protrusion 71 engages.

4 Claims, 4 Drawing Sheets

CROSS-SECTION A-A

DATA CARRIER LOADER AND METHOD FOR LOADING

BACKGROUND OF THE INVENTION

1. Field of the Invention

The present invention relates to a data carrier loader and associated loading method.

2. Background of the Invention

A variety of storage media for recording and storing data, such as magnetic tapes and optical disks are known. Using these types of recording media, however, because the capacity is finite, the amount of data that can be stored on them is also limited. In a computer system or data retrieval system in which a large amount of data must be stored, in order to include all the required data, a large number of storage media are required. Additionally, in order to retrieve data from a data carrier, it is necessary to insert this storage medium into a data reading apparatus such as a tape drive unit. In a system that requires a large number of storage media, it is troublesome to have to manually and continuously insert the storage media into and remove the media from the reading apparatus. Because of this, in many such systems a data carrier magazine, which has a plurality of storage media is used, this magazine being installed in the apparatus having the reading apparatus. Having done this, a selected medium is automatically removed from the magazine, and automatically inserted into the reading apparatus, at which data is read from the medium or new data is written thereonto, after which the medium is automatically removed from the reading apparatus and stored within the magazine. The overall unit that includes the magazine, the data reading apparatus, and the automatic mechanism that removes the storage medium from the magazine, inserts it into the reading apparatus, removes it from the reading apparatus, and then stores it in the magazine is generally called a loader.

There are a number of types of known loaders, one example being a type in which both the magazine and the reading apparatus are disposed at fixed positions, an "elevator" or other type of data carrier movement mechanism being used to move a selected storage medium from the magazine to and insert the storage medium into the reading apparatus. This type of loader is described below, with reference to FIG. 3 and FIG. 4 of the accompanying drawings.

FIG. 3 is a cross-section view of the loader, FIG. 4 is a cross-section view of a mechanism moving an accessor 7 of the movement mechanism up and down, and FIG. 5 is a side view of the mechanism of FIG. 4.

The loader 1 shown in FIG. 3 has, within a casing 2, a data reading apparatus 3 and a magazine 4, capable of accommodating three recording media 5, such as magnetic disk cartridges, this magazine being fixed. Additionally, as shown in FIG. 3, there is a transfer mechanism for transferring a recording medium 5 between the magazine 4 and the data reading apparatus 3. This transfer mechanism has a picker 6, which moves in the directions indicated by the arrow A in FIG. 3, so as to remove a recording medium 5 from the magazine 4 and the data reading apparatus 3, and an accessor 7, onto which the picker 6 rests, for moving the recording medium 5 up and down (in the directions indicated by the arrow B) between the magazine 4 and the data reading apparatus 3. FIG. 3 shows that the recording medium 5 is pulled out from the magazine by the picker 6, moved to the data reading apparatus 3 by the accessor 7, and inserted into the data reading apparatus 3, the picker 6 then returning. FIG. 3 further shows that after data reading by the data reading apparatus 3 is completed, the picker 6 removes the recording medium 5 from the data reading apparatus 3, and the accessor 7 returns the recording medium 5 to storage position 51 of the magazine 4.

FIG. 4 shows an accessor movement plate 9 for moving the accessor 7 up and down (in the direction of the arrow B), a drive motor 11 having a gear 12 for moving the accessor movement plate 9 in the direction of the C, and a sensor 10 for detecting the position of the accessor movement plate 9. The accessor movement plate 9 is provided with a staircase-shaped cutout hole 9 as shown in FIG. 4, into which a protrusion 71 of the accessor 7, as shown in FIG. 5, is inserted. The accessor 7 is mounted to cylindrical shafts 13 and can move freely up and down. Thus, when the accessor movement plate 9 moves, the accessor 7 moves up and down. The flat surfaces of the hole 91 are provided so as to stop the accessor 7 at positions at which the picker 6 pulls out a recording medium 6. Slits 92 are provided at positions corresponding to these flat parts of the accessor movement plate 9, these slits being detected by the sensor 10 to enable verification of the position of the accessor 7.

In the prior art, however, there is the problem that the apparatus becomes excessively large. Specifically, because to ensure smooth movement of the accessor 7 when the accessor movement plate 9 is moved, it is not possible to make the inclined parts of the staircase shaped cutout hole 91 excessively sharp, it is not possible to make the size of the movement plate 9 small. Additionally, with an increase in the number of recording media, the movement plate 9 becomes commensurately large, and it is also necessary to provide sufficient space for the movement plate 9 to move, these problems presenting a great hindrance to the achievement of a compact loader design.

FIG. 6 shows an automatic loader as disclosed in Japanese Unexamined Utility model Publication (KOKAI) No. 6-84542, in which the reference numeral 33 denotes a housing apparatus that has a housing part 32 for housing a CD, 36 is a carriage for transporting a CD 31, this carriage being moved in the vertical direction by a drive motor 37, 38 is a drive gear fixed to the shaft of the motor 37, which meshes with the drive part 44 of the carriage 36, and 3A to 3C are guide rollers for supporting the carriage 36 within the housing part 32. This automatic loader, however, does not disclose the present invention.

Accordingly, in consideration of the above-noted drawbacks in the prior art, it is an object of the present invention to provide a novel data carrier loader and loading method which improve on the drawbacks of prior art, by enabling the achievement of a compact loader design.

SUMMARY OF THE INVENTION

In order to achieve the above-noted object, the present invention has the following basic technical constitution.

Specifically, the first aspect of the present invention is a data carrier loader for moving a recording medium such as a magnetic tape cartridge from a first position to a second position, the data carrier loader comprising, an accessor for holding and moving a recording medium from the first position to the second position and vice versa, a protrusion provided on the accessor, a guide member for guiding movement of the accessor from the first position to the second position, a rotatable screw shaft on which is formed a helical groove, with which the protrusion engages.

In the second aspect of the present invention, a plurality of portions for positioning the accessor are provided on the helical groove.

In the third aspect of the present invention, a plurality of flat portions with no inclination used for positioning the accessor, are provided on the helical groove.

In the fourth aspect of the present invention, a rotation detecting means for detecting the number of rotations of said screw shaft, is integrally provided on an end portion of said screw shaft.

In the fifth aspect of the present invention, the guide member comprises a cylindrical guide shaft.

A data carrier loader according to the present invention is intended for use in loading a recording medium such as a magnetic tape cartridge, and has within the casing thereof a data reading apparatus (which can also be used for writing data onto the recording medium), and a magazine, in which at least two recording media are held, and a transfer mechanism which transfers a recording medium between a magazine and the data reading apparatus. The transfer mechanism has a picker for removing the recording medium from the magazine and from the data reading apparatus, and for inserting the recording medium to the magazine and to the data reading apparatus, and an accessor for moving the recording medium between the magazine and the data reading apparatus, the picker being placed on the accessor. The accessor is driven by drive motor via a rotating screw shaft, this screw shaft being a cylindrical bar with a helical groove formed on the surface thereof, the groove having a plurality of flat portions which, when a recording medium is to be removed or inserted, provides precise positioning of the picker. The accessor is moved by rotation of the screw shaft. The accessor is provided with an adjacent sensor for detecting the rotation of the screw shaft, the screw shaft having a counter for counting the number of rotations of the shaft using this sensor.

BRIEF DESCRIPTION OF THE DRAWINGS

FIG. 6(*b*) shows a plan view thereof.

DESCRIPTION OF THE PREFERRED EMBODIMENTS

Preferred embodiments of the present invention are described below, with reference being made to relevant accompanying drawings.

Figure 1:
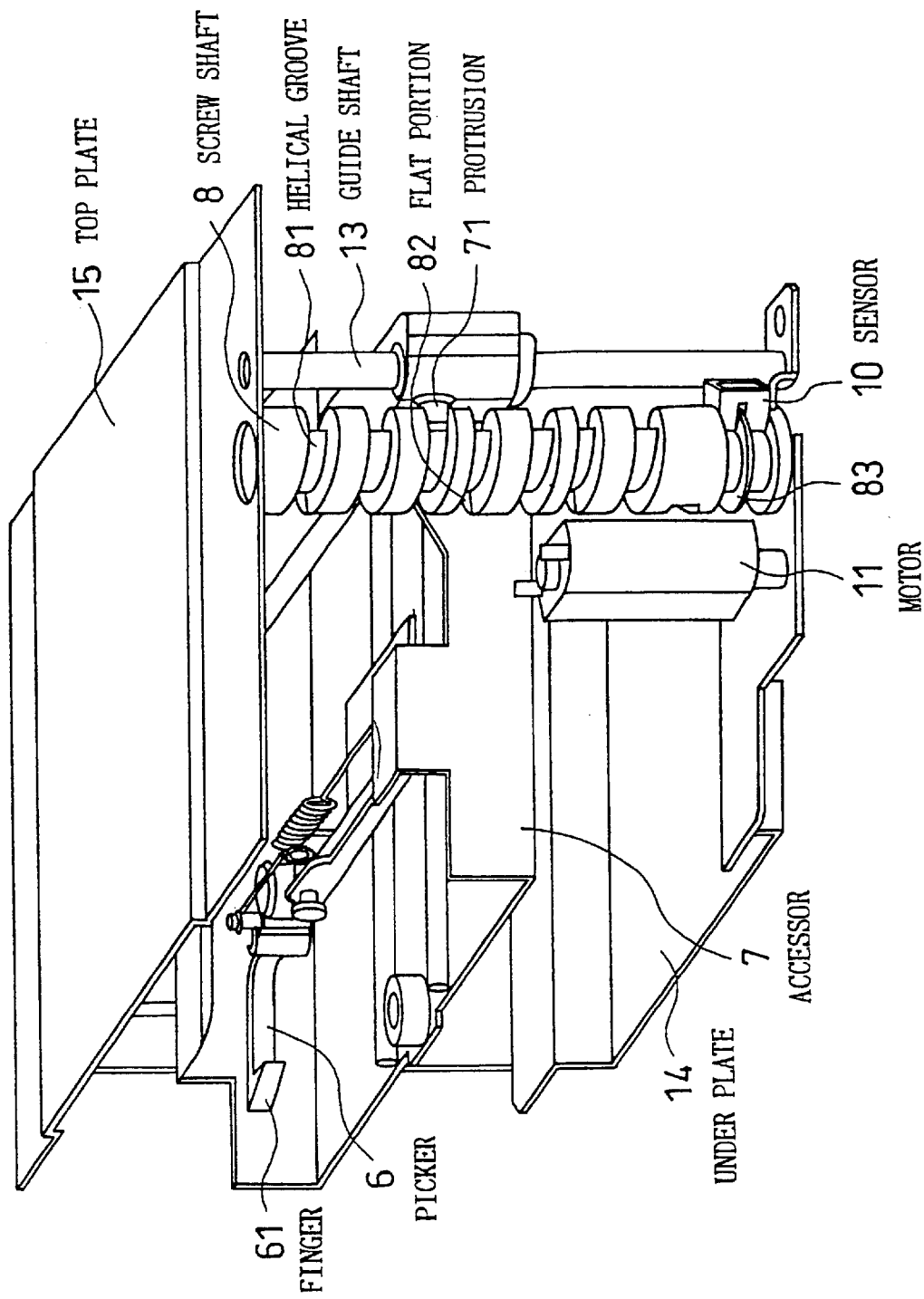
FIG. 1 is a perspective view showing a data carrier loader according to the present invention.
Figure 2A:
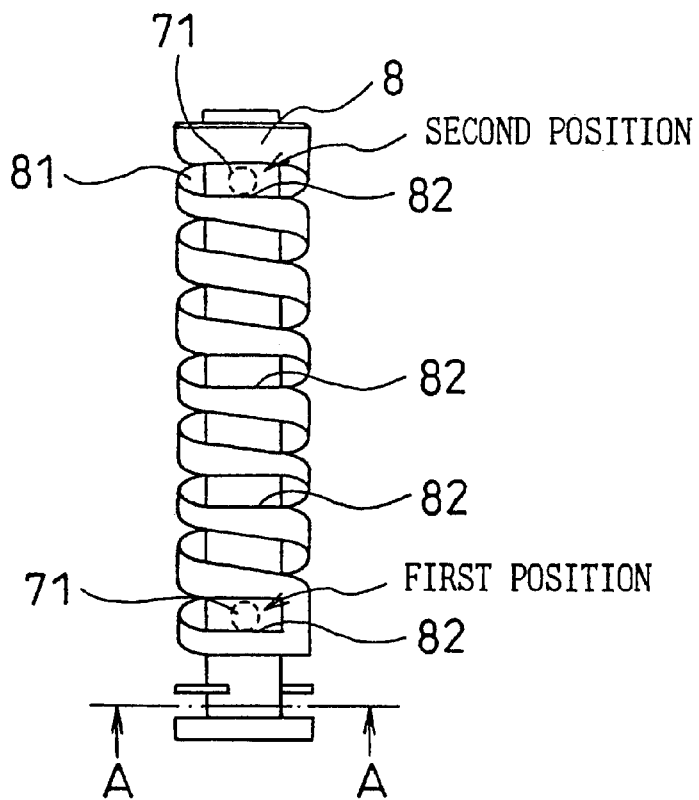
FIG. 2(*a*) is a side view of the screw shaft and FIG. 2(*b*) is a cross-section view thereof.
Figure 2B:
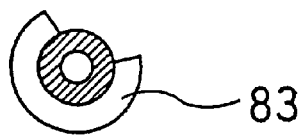
Figure 3:
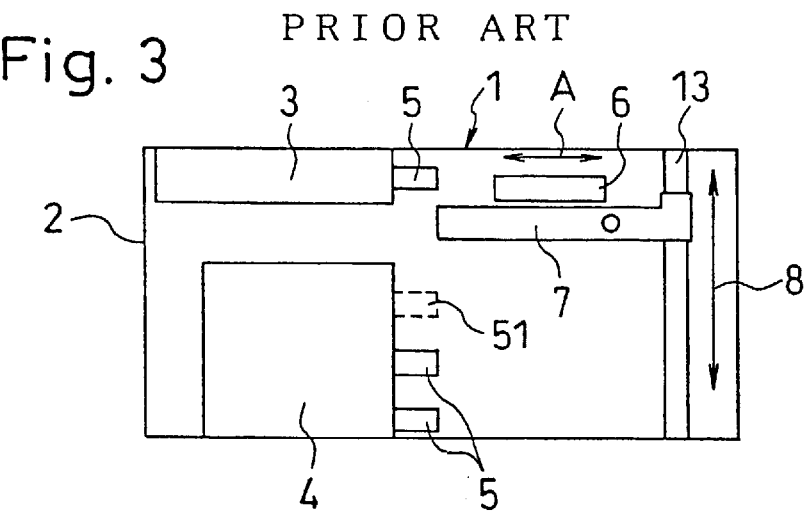
FIG. 3 is a side view of a data carrier loader according to the prior art.
Figure 4:
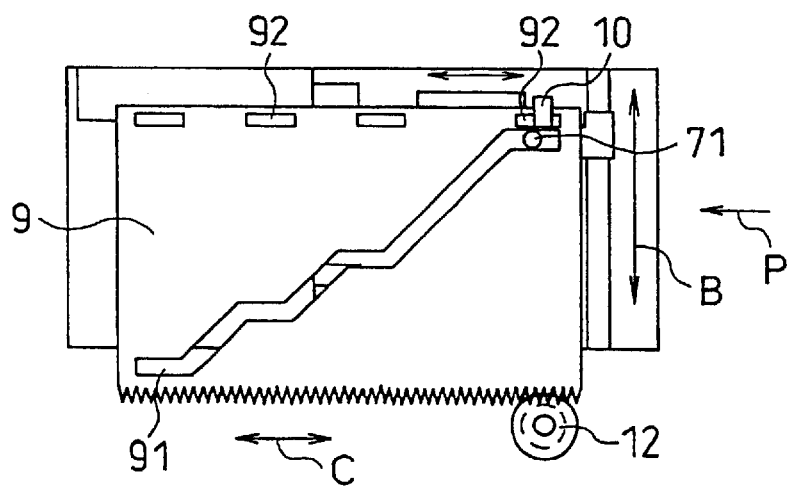
FIG. 4 is a cross-section view illustrating a data carrier loader according to the prior art.
Figure 5:
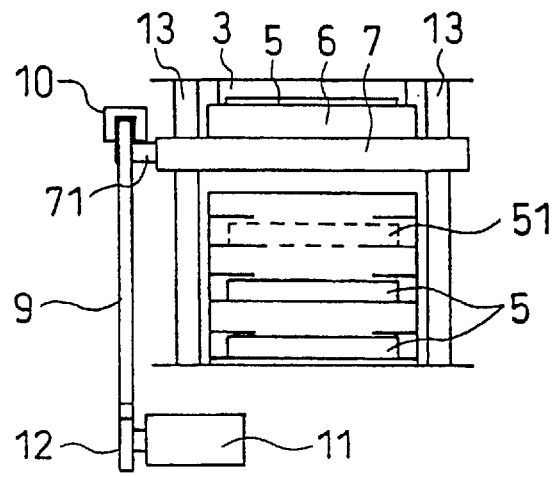
FIG. 5 shows the data carrier loader of the prior art as viewed from the direction P shown in FIG. 4.
Figure 6A:
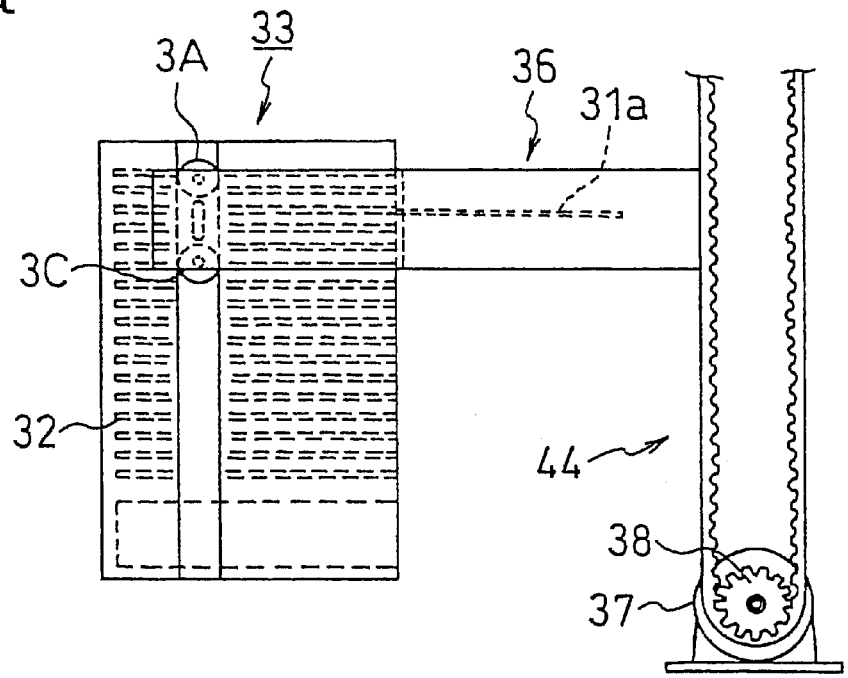
FIG. 6(*a*) shows a side view of another prior art.
Figure 6B:
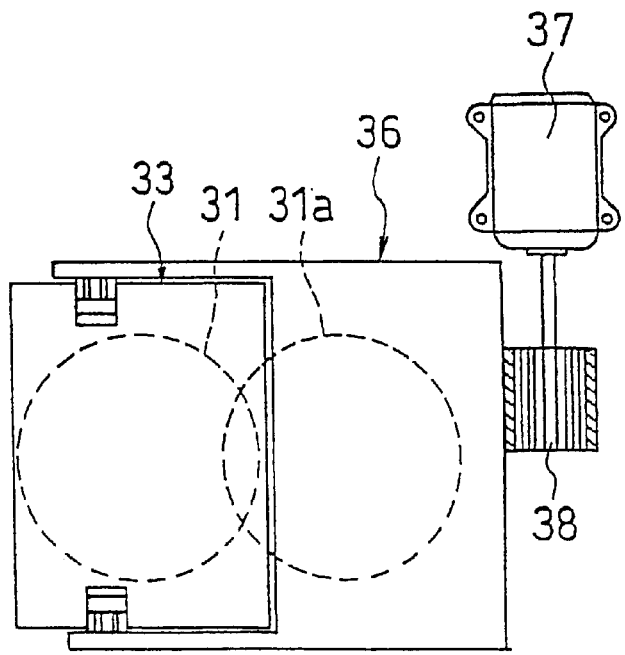

FIG. 1 and FIG. 2 show specific examples of the structure of an implementation of a data carrier loader and loading method according to the present invention. These drawings show a data carrier loader for moving a recording medium such as a magnetic tape cartridge from a first position to a second position, this data carrier loader having an accessor 7 that holds and moves the recording medium from the first position to the second position, a guide member 13 that guides the movement of the accessor 7 from the first position to the second position, a protrusion 71 provided on the accessor 7, and a rotatable screw shaft 8 in which is formed a helical groove, the protrusion 71 of the accessor 7 engaging this helical groove 81 of the screw shaft 8.

As shown in these drawings, the helical groove 81 has a plurality of flat potions 82 with no inclination, these flat potions 82 being used for positioning in this data carrier loader.

Additionally, on the end part of the screw shaft 81 is integrally provided a rotation detecting means 83 for detecting the number of rotations of the screw shaft 81.

The present invention is described in further detail below.

The difference between a loader according to the present invention and a loader according to the prior art lies in the mechanism that moves the accessor 7.

This transfer mechanism has a picker 6, which removes a data carrier from the magazine and from the data reading apparatus, and inserts a data carrier into the magazine and into the data reading apparatus. The picker 6 has a finger 61 at its end for holding the recording medium, this finger opening and closing so as to either hold or release the recording medium.

The data carrier loader according to the present invention also has an accessor 7, on which the picker 6 is placed, for moving the recording medium between the magazine and the data reading apparatus. In the loader according to the present invention is provided with a drive motor 11 and a screw shaft 8 that is rotated by means of a linkage thereto via a gear, the rotation of the screw shaft 8 causing the up and down movement of the accessor 7. In order to achieve this, the screw shaft 8 has a helical groove 81 formed in the outer peripheral surface of the cylindrically shape thereof, this groove 81 having a plurality of flat surface parts 82 with no inclination, for the purpose of precisely position the picker 6 when removing and inserting the recording medium. FIG. 2 shows a side view of the screw shaft 8, in which a plurality of flat surface parts 82 are formed. The accessor 7 is mounted to cylindrical guide shafts 13 so that it can freely move up and down. The protrusion 71 provided on the accessor 7 is engaged with the helical groove 81 of the screw shaft 8.

Additionally, the accessor 7 has a sensor 10 adjacent thereto, for detecting the rotation of the screw shaft 8. The screw shaft 8 has a disc-shaped member 83 with a cutout part as shown in the cross-section view A—A of FIG. 2. This disc-shaped member 83 serves as a light-blocking plate for the sensor 10. By providing a partial cutout in this light-blocking plate, it is possible to count the number of rotations of the screw shaft 8 using the sensor 10. For this reason, it is possible to detect movement of the accessor 7 from the uppermost part or the lowermost part by means of the number of rotations.

An underplate 14 and top plate 15 are provide to hold the above-noted structure in place.

The operation of the transfer mechanism shown in FIG. 1 is as follows.

The picker 6 disposed on the accessor 7 moves forward with the finger 61 at the end thereof in the open condition. By closing the finger 61 the recording medium is held, after which the picker 6 retreats so as to pull the recording medium out from either the magazine or the data reading apparatus. In the other direction, the picker advances while holding a recording medium so as to enable insertion into either the magazine or the data reading apparatus, and opens the finger 61 so as to release the recording medium.

The accessor 7 is moved up and down by rotation of the drive motor 11 that rotates the screw shaft 8, causing the protrusion 71 of the accessor 7 to move within the groove 81 of the screw shaft 8. A specific example of the operation of this mechanism, including relative positions, is as follows. First, for example, the screw shaft 8 is caused to rotate, moving the accessor 7 to the uppermost position, and when the current value of the drive motor is detected as having exceeded a prescribed value, the judgment is made that the uppermost position has been reached. At this point, the sensor 10 is blocked by the light-blocking plate of the counter 83. In synchronization with the first time cutout of the light-blocking plate of the sensor 10 is reached, by stopping the rotation of the screw shaft 8 so that the accessor 7 is positioned at a flat part 82 of the screw shaft 8, it is possible to accurately position the accessor 7. At this position is disposed the data carrier insertion port of the data reading apparatus, enabling the insertion and removal of the recording medium by the picker 6. Additionally, after the screw shaft 8 rotates a number of times, synchronized with the reaching of the cutout part of the light-blocking plate of the counter 83, another flat part 82 of the screw shaft 8 is reached, thereby enabling the accurate positioning of the accessor 7 at another prescribed position. At this position is disposed the data carrier insertion port of the magazine, enabling the insertion and removal of the recording medium by the picker 6. Thus, by disposing a plurality of flat parts 82 on the screw shaft 8 for the purpose of positioning, it is possible to move and position the accessor 7.

A method for loading a data carrier according to the present invention has the constitution described in detail above, enabling its use in a compact data carrier loader.

What is claimed is:

1. A data carrier loader for moving a recording medium from a first position to a second position, said data carrier loader comprising:

an accessor for holding and moving said recording medium from said first position to said second position and vice versa;

a protrusion on said accessor;

a guide member for guiding movement of said accessor from said first position to said second position; and a rotatable screw shaft comprising a helical groove, said helical groove comprising a plurality of flat portions with no inclination for positioning said accessor, said protrusion engaging said helical groove.

2. The data carrier loader according to claim 1, further comprising a rotation detector integral with an end portion of said screw shaft to detect a number of rotations of said screw shaft.

3. The data carrier loader according to claim 1, wherein said guide member comprises a cylindrical guide shaft.

4. A method of moving a recording medium comprising the steps of:

rotating a screw shaft with a helical groove having flat portions with no inclination, rotation of the screw shaft moving an accessor on a guide;

stopping rotation of the screw shaft at one of the flat portions when said one of the flat portions corresponds to a recording medium storage position;

loading the recording medium onto the accessor; and rotating the screw shaft to move the recording medium to a position at which another one of the flat portions corresponds to another storage position at which the recording medium is to be discharged from the accessor.

* * * * *